Aug. 22, 1961    R. S. PIKE    2,997,099
ALIGNER AND SPLICER FOR FILM AND THE LIKE
Filed Jan. 28, 1957
FIG. 1.
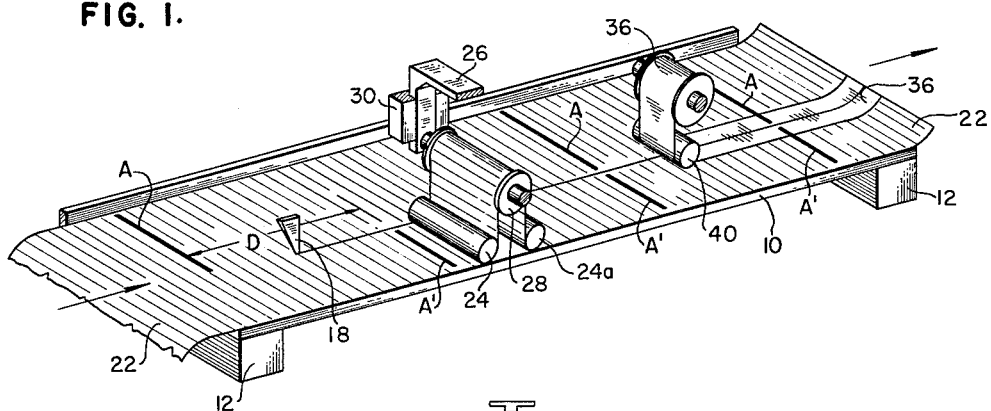
FIG. 2.
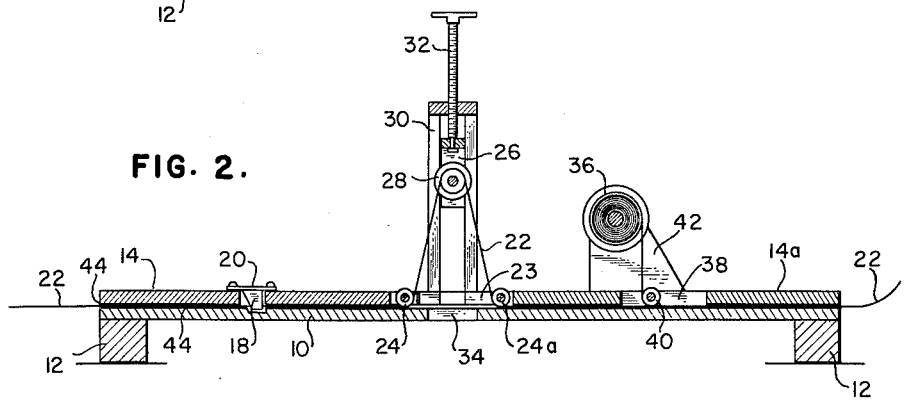
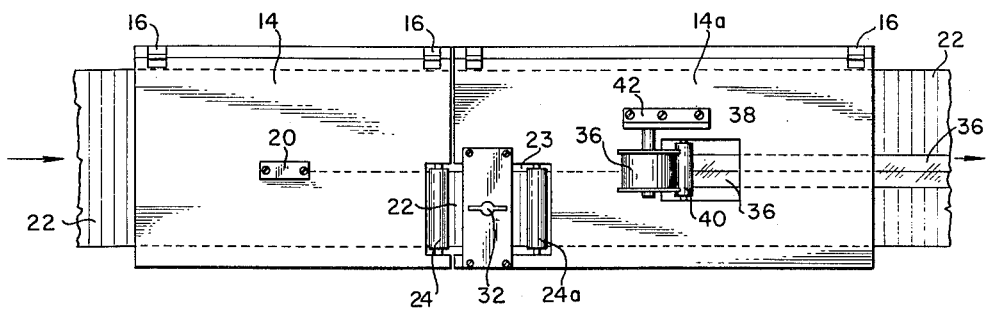
FIG. 3.
INVENTOR.
Robert S. Pike
BY Earl Babcock.
ATTORNEY.

United States Patent Office 2,997,099
Patented Aug. 22, 1961

2,997,099
ALIGNER AND SPLICER FOR FILM AND THE LIKE
Robert S. Pike, Houston, Tex., assignor, by mesne assignments, to Halliburton Company, a corporation of Delaware
Filed Jan. 28, 1957, Ser. No. 636,809
4 Claims. (Cl. 154—42.3)

This invention relates to a device which cuts a material into strips, displaces such strips into a predetermined alignment, and then splices together such aligned strips.

More particularly the invention relates to performing such operations to a roll of film or charts, where it is desired to align drawings, lines, figures, etc. in a predetermined relationship.

The invention is specifically adapted for assembling data obtained in electrical well bore logging operations. In many logging operations several curves showing different conditions within a well bore are recorded on the same strip of film at the surface of the ground from detection and signaling apparatus lowered into the bore hole. Each point on the curve gives an indication of a condition at a certain depth. Of physical necessity the detection apparatus to produce each curve must sometimes be vertically disposed along the logging tool. For example, a convenient displacement distance between such detection apparatus may be ten feet. Consequently, since the recording device concurrently records all detected signals, any similar points on the series of curves recorded on the film will be displaced a proportional distance. Patents Nos. 2,573,133 and 2,573,137 to Greer are examples of such electrical well logging operations.

In order to analyze conditions at a given depth, as reflected on the different curves, it is desirable to have corresponding points on all curves in transverse alignment.

In order to accomplish such alignment under prior methods, the film has been manually cut so that each curve is on a single strip. The strips have then been aligned by hand, so that the corresponding points on the curves all indicate the same depth and are positioned opposite each other. Then the aligned strips have been spliced together. Then the film has been read directly or prints made therefrom. It is readily apparent that such film strips of a well bore log are many feet in length. Consequently, in the prior methods the film falls to the floor, becomes dirty, breaks, and is difficult to handle. Also such methods are time consuming, laborious, and expensive.

In accordance with the present invention, it is proposed to provide an apparatus which cuts, aligns, and splices the film in a simple operation.

The objects and advantages of the invention will be apparent, when considered with the following description and accompanying drawing, in which—

FIGURE 1 is an isometric view illustrating a portion of one form of apparatus constructed in accordance with the present invention.

FIGURE 2 is a side elevation of the apparatus of FIGURE 1 but also showing a hinged cover, which is not shown in FIGURE 1.

FIGURE 3 is a plan view of the apparatus of FIGURE 2.

In the drawing, numeral 10 refers to tabletop-like member used as a supporting frame. This member 10 may be placed on a table not shown, or have any suitable legs as 12. Member 10 has a two piece movable cover 14 and 14a attached to it by hinges 16. The drawing illustrates a cutting means, such as a knife 18 mounted on the cover 14 by a bracket 20. A strip of film which is to be cut and aligned is designated by 22. The corresponding points on the film which are to be aligned are designated as A and A′ and the distance between them is indicated by D in FIGURE 1.

Mounted on the covers 14 and 14a is a means to provide the correct alignment of the points A and A′ of the film 22. The covers are slotted to form a common opening 23 therebetween. Positioned in opening 23 are two idler rollers 24 and 24a. A carriage 26 carrying a correction roller 28 is slidably mounted for vertical movement in a trackway 30 fixed to the top of cover 14a. An adjusting screw 32 is provided to position the carriage 26 in trackway 30. The member 10 has an opening 34 to accommodate the lowermost positioning of carriage 26. Cover 14a is also provided with a means to hold and apply a splicing tape 36 to the film 22 after it is aligned. Such means consists of a roller 40 mounted in an opening 38 in the cover 14a and a bracket 42 adapted to carry a roll of the splicing tape 36. The underside of the covers 14 and 14a and the top of member 10 is covered with a suitable material such as felt pads 44 to protect the film.

All of the foregoing elements of the apparatus are illustrated as being mounted on the covers 14 and 14a. However, the said elements could readily be mounted on member 10.

An illustration of the operation and coaction of the elements of the invention is as follows:

The film 22 may have two curves thereon depicting electrical conditions in a well bore. These curves are not illustrated since they are well known in the electrical well logging art. Only the points A and A′ designating the same position in the well bore of each curve will be considered. On the film 22 these points A and A′ are not positioned opposite each other due to the displacement of the signal sending apparatuses as discussed above. It is desired to place the points A and A′ opposite each other in order that an operator may read both curves simultaneously and make an interpretation thereof.

The covers 14 and 14a are maintained in an upward or open position and the film 22 is placed on member 10. The cover 14 is lowered onto the member 10 and the film 22 is held between the felt pads 44. The film 22 is pushed ahead and is cut by the knife 18 so that the points A and A′ are on separate portions of the film 22. The cover 14a is then lowered onto the member 10. The portion with the point A′ on it is then fed under the roller 24, over the roller 28, and under the roller 24a. The portion with the point A on it is fed along the surface of the member 10. Both portions then pass under the roller 40. The roller 28 is adjusted by the screw 32 to such height that the portion of film 22 passing over roller 28 has a length equal to that of the distance D between the points A and A′. Thus, it is seen that as the cut portions of the film 22 pass under the roller 40, the points A and A′ are now opposite each other. As the cut portions of the film 22 pass under the roller 40 a splicing tape 36 is automatically applied and the cut portions are now spliced together.

Therefore, it is seen that this invention provides an apparatus which takes a strip of film, cuts it, aligns two points on it, and splices the cut film together in a simple, efficient, and economical manner.

It is apparent that those skilled in the art may make many useful adaptations of the apparatus without departing from the spirit of the invention and the scope of the annexed claims.

I claim:
1. Chart alignment apparatus comprising; support means including a frame and a cover for supporting a portion of a longitudinally extended chart while permit- ting longitudinal movement of said chart, cutting means mounted with said support means for splitting said chart into longitudinal sections upon movement of said chart through said support means; displacement means including a roller mounted with said support means in perpendicularly adjustable relation to said chart portion for displacing said chart sections in preselected longitudinal relation upon chart movement; and splicing means including a splicing tape application roller mounted with said support means for applying a splicing tape to the longitudinally displaced sections of said chart upon movement of said chart to splice said chart into an integral unit.

2. Chart alignment apparatus comprising; support means for supporting a longitudinal portion of a longitudinally extended chart while permitting longitudinal movement of said chart, cutting means mounted on said support means for splitting said chart into longitudinal sections upon movement of said chart through said support means; selectively adjustable displacement means with said support means for perpendicularly displacing at least one of said chart sections in preselected and finite longitudinal relation with another of said sections upon said chart movement; and splicing means mounted on said support means for splicing said longitudinally displaced sections of said chart into an integral unit upon said chart movement.

3. In alignment apparatus for concurrently splitting a chart of extended length into longitudinal sections, displacing such sections in selective longitudinal relation, and splicing such sections in said displaced relation, the combination of; support means for supporting a portion of a chart while permitting longitudinal movement of said chart; cutting means mounted on said support means for splitting said chart into longitudinal sections; selectively adjustable displacement means mounted on said support means for perpendicularly displacing at least one of said chart sections in preselected and finite longitudinal relation with another of said chart sections; and splicing means mounted on said support means for splicing said longitudinally displaced sections into a restored composite chart.

4. In alignment apparatus for concurrently splitting a moving chart of extended length into longitudinal sections, displacing such sections in selective longitudinal relation, and splicing such sections in displaced relation, the combination of; support means including a frame and a cover for supporting a longitudinal portion of said chart while permitting longitudinal movement of said chart; cutting means mounted on said support means for splitting said chart into longitudinal sections; displacement means including a roller mounted on said support means in perpendicularly adjustable relation for displacing at least one of said chart sections in preselected longitudinal relation with another of said chart sections; and splicing means including a splicing tape application means mounted on said support means for splicing said longitudinally displaced sections into a restored composite chart.

References Cited in the file of this patent
UNITED STATES PATENTS

| | | |
|---|---|---|
| 1,714,870 | Halliwell | May 28, 1929 |
| 2,214,593 | Mustin et al. | Sept. 10, 1940 |
| 2,362,413 | Shields | Nov. 7, 1944 |
| 2,475,351 | Castay | July 5, 1949 |
| 2,555,806 | Mitchell | June 5, 1951 |
| 2,685,417 | Bartelson | Aug. 3, 1954 |
| 2,827,104 | Rives | Mar. 18, 1958 |
| 2,839,256 | Boyan et al. | June 17, 1958 |